(12) United States Patent
Ziemke et al.

(10) Patent No.: US 7,670,060 B2
(45) Date of Patent: Mar. 2, 2010

(54) PLUG CONNECTOR WITH AN ADAPTOR HOUSING FOR RECEIVING A PLUG OR SOCKET ARRANGEMENT

(75) Inventors: Juergen Ziemke, Detmold (DE); Ralf Schumacher, Lemgo (DE); Michaela Muecke, Detmold (DE); Andreas Muhs, Borgentreich (DE); Volker Schroeder, Lemgo (DE)

(73) Assignee: Weidmuller Interface GmbH & Co. KG, Detmold (DE)

( * ) Notice: Subject to any disclaimer, the term of this patent is extended or adjusted under 35 U.S.C. 154(b) by 0 days.

(21) Appl. No.: 12/319,305

(22) Filed: Jan. 6, 2009

(65) Prior Publication Data
US 2009/0185777 A1 Jul. 23, 2009

(30) Foreign Application Priority Data
Jan. 21, 2008 (DE) .................. 20 2008 000 885 U
Feb. 1, 2008 (DE) .................. 20 2008 001 535 U
Apr. 12, 2008 (DE) .................. 20 2008 005 101 U (51) Int. Cl.
G02B 6/38 (2006.01)
(52) U.S. Cl. .......................................... 385/55; 385/58
(58) Field of Classification Search ............. 385/53–55, 385/58–59, 88, 141, 147
See application file for complete search history.

(56) References Cited

U.S. PATENT DOCUMENTS

| 4,286,834 A | * | 9/1981 | Goodman et al. | ............ 439/191 |
| 4,349,236 A | | 9/1982 | Guelden | |
| 4,589,716 A | * | 5/1986 | Williams, II | ................ 439/348 |
| 4,709,975 A | * | 12/1987 | Williams, II | ................ 439/350 |
| 6,475,009 B2 | | 11/2002 | Below | |
| 6,595,791 B2 | | 7/2003 | Below | |
| 7,510,336 B2 | * | 3/2009 | Sakaji et al. | ................... 385/88 |

FOREIGN PATENT DOCUMENTS

| DE | 102 36 275 B3 | 1/2004 |
| DE | 10 2006 000 702 A1 | 4/2007 |
| DE | 20 2006 011 910 U1 | 4/2007 |

* cited by examiner

Primary Examiner—Akm E Ullah
(74) Attorney, Agent, or Firm—Lawrence E. Laubscher, Sr.; Lawrence E. Laubscher, Jr.

(57) ABSTRACT

A fiber optic connector arrangement includes a locking device for fastening together a pair of male plug and female socket components, which locking device consists of locking elements mounted solely on a pair of telescopic adapter housings that support the plug and socket components when in the engaged condition. In order to increase the operational life of the connector components, one of the plug and socket components contains a recess for receiving an auxiliary second locking device that extends longitudinally in a normally non-stressed unlocked inoperative condition from the other component.

13 Claims, 6 Drawing Sheets

PLUG CONNECTOR WITH AN ADAPTOR HOUSING FOR RECEIVING A PLUG OR SOCKET ARRANGEMENT

BACKGROUND OF THE INVENTION

1. Field of the Invention

A fiber optic connector arrangement includes a locking device for fastening together a pair of male plug and female socket components, which locking device consists of locking elements mounted solely on a pair of telescopic adapter housings that support the plug and socket components when in the engaged condition. In order to increase the operational life of the connector components, one of the plug and socket components contains a recess for receiving an auxiliary second locking device that extends longitudinally in a normally non-stressed unlocked inoperative condition from the other component.

2. Description of Related Art

The present invention relates to a plug and socket connection having a first male plug-type plug connector and a second female jack-type plug connector, including the following features. The first plug connector has an outer adapter-protective housing arrangement—an adapter housing—into which a plug arrangement for connecting conductors, preferably fiber-optic connectors, is inserted. The second jack-type plug connector has an outer adapter-protective housing arrangement—an adapter housing—into which a jack arrangement is inserted, such that the two adapter housings can be coupled together, in particular can be locked together, and the jack arrangement also has locking means in the adapter housing which are designed to implement a lockable push-pull connection.

Plug connections of the generic type allow the use of the connector and jack arrangements inserted into the adapter housing even in a rough environment—e.g., in production plants or vehicles—by achieving a higher safety class, e.g., IP65 or IP67, in comparison with the safety class (usually IP20) of the internal plug-and-jack arrangement.

A first such arrangement for a telephone jack is known from the U.S. patent to Guelden (Bell Telephone Laboratories) U.S. Pat. No. 4,349,236. The idea of achieving higher demands based on environmental classifications, e.g., in the U.S. patents to Below et al U.S. Pat. Nos. 6,475,009 and 6,595,791, has been developed further. These patents describe various adapter-plug housings and adapter-jack housings, which are suitable for accommodating RJ45 plugs and/or RJ45 jacks. In this context, the German patent No. DE 102 36 275 B3 is also mentioned.

In addition, optimized solutions are also disclosed in the German patent No. DE 20 2006 011 910, and the European patent No. EP 1 848 068 A1. These documents disclose adapter housings that are suitable to receive not only plug-and-jack arrangements for connecting electric conductors, but also for plug-and-jack arrangements of another type, in particular for receiving plug-and-jack arrangements for connecting fiber-optic connectors.

However, another problem may occur here. Many plug arrangements for connecting fiber-optic connectors, such as SC plugs and jacks, are designed as so-called "push-pull" plugs which have an outer part that is displaceable by a limited distance in relation to an inner part. To release such plug arrangements, the outer housing of the plug arrangement must be displaced this defined distance in relation to the inner housing. This approach has proven successful per se. However, there is a demand for optimization with regard to the use of such SC plug connectors of a lower grade of protection, such as IP20 in adapter housings for implementation of a higher level of protection, such as IP65 or more.

According to the German published application No. DE 10 2006 000 702 A1, the push-pull connection of the ST plug-and-jack arrangement may also be released even when using an adapter housing, so it is proposed that the outer adapter housing should be designed in two parts to receive the one plug connector part, whereby the two housing parts are displaceable relative to one another by a distance that is limited by stops. The locking of the SC-RG insert and the locking of an IP20 SC-RJ plug on the IP67 side of a jack can be released via the catch engagement of the IP67 adapter housing for service purposes, but the goal is to implement a two-piece housing having self-limiting displacement, that is yet to be optimized in its handling and stability.

There have therefore already been attempts to release the lock on the SC-RJ insert. Among other things, the use of a standardized protective housing for a wide variety of copper and fiber-optic inserts has also been considered. With the approach attempted in the past, one of the two plug arrangements of a low type of protection, in particular the SC jack arrangement, remains unchanged, so that it is still possible to connect these parts without an external adapter part, e.g., for testing and service purposes, using an SC plug arrangement in the push-pull standard that is "compliant with the standard" or in accordance with the standard. This means that in the event of service on the SC jack arrangement inserted into an adapter housing constructed according to the standard IEC 874-19, a plug arrangement according to this standard can be connected without an adapter housing, in which case the parts are locked together by a catch hook, for example. This is achieved by the fact that the SC plug arrangement inserted into the respective adapter housing has a modified design inasmuch as the catch hook of the SC jack arrangement is bent outward when plugged together with the SC plug part in the adapter housing.

With the intended approach, however, it may occur that after many years of continuous use of an IPC67 plug connection, an IP20 plug can no longer be engaged for service purposes because against the background of the high temperatures in the transceiver, the SC holding clamps may be permanently deformed (disabled) due to widening and can no longer be engaged. Therefore, this problem is to be eliminated.

SUMMARY OF THE INVENTION

Accordingly, a primary object of the present invention is to provide a fiber optic connector arrangement including locking means for fastening together the male plug and female socket components of the arrangement, which locking means consists solely of first locking elements mounted on a pair of telescopic adapter housings that support the plug and socket components when in the engaged condition.

According to a more specific object of the invention, in order to increase the operational life of the connector components, one component contains a recess for receiving in a normally non-stressed inoperative condition an auxiliary second locking device that extends longitudinally from the other component.

Against this background, the object of the present invention is to improve upon the approach defined above, so that coupling of the jack arrangement accommodated in an adapter housing push-pull locking means with a push-pull plug arrangement is possible even after many years without the use of protective adapter housing. This object is not limited to plug connectors having plug-and-jack parts in the SC standard but instead it should allow in general an advantageous integration of IP20 push-pull plug connectors (e.g., the SC or SC-RJ type) in a plug connector protective housing of a higher level of protection (e.g., IP67) such as that depicted as an example—but not conclusively—in the proposed industrial standards IEC 61076-3-17 or IEC 61076-3-106. In addition, a push-pull connection in which the plug arrangement is not provided with an adapter housing is also to be implemented for test purposes.

According to this, the plug arrangement inserted into the adapter housing of the plug-type plug connector is designed so that the locking means of the jack arrangement undergo little or no significant deflection or deformation in the mated state and are nonfunctional in the mated state, so that a locked push-pull connection is not implemented between the plug arrangement and the jack arrangement in this configuration.

The plug-type plug connector is designed to be free of locking means, i.e., such that the locking means of the jack arrangement in the adapter housing of the jack-type plug connector do not become engaged with locking means on the jack arrangement in the jack-type plug connector and undergo no deformation at all or at any rate no significant deformation. The term "no significant deformation" is to be understood as meaning that any possible slight deformation that might still occur is so minor that after deformation for a long period of time, e.g., more than three years, deformation of the locking means, rendering them useless, is permanent in no more than 10% of the cases, in particular in no more than 5% of the cases.

Thus, even after many years of use, it remains possible to release the plug connection with the two protective adapter housings having a stable design and then attach and lock/engage a plug arrangement on the inner, preferably standardized, jack arrangement of the jack-type plug connector, said plug arrangement having locking means of a push-pull connection that correspond to the locking means, in particular catch hooks, so that tests and the like can be performed.

The locking of the plug connector insert (e.g., SC-RJ) need not be released via the locking of the IPC67 protective housing, for example. An adapter housing which nevertheless can be used and/or implemented for a wide variety of electric conductors (e.g., copper: RJ45, USB, . . . ) and fiber-optic inserts (e.g., SC-RJ, LC duplex, . . . ) to avoid high costs for individual protective housings for the inserts.

An important advantage of the approach according to the present invention may also be seen in the fact that an adapter housing having a definitely more robust and simpler design than that proposed in DE 10 2006 000 702 A1 may also be used. Thus the relative displacement of the two housing parts on a cable screw connection and toward the plug face may be omitted in particular.

Furthermore, it remains possible to comply with the specification of some industrial standards according to which locking of IP20 fiber-optic connectors on the IPC67 side of flanges/wall feed throughs and devices for service purposes must also be possible.

The locking of the two outer adapter housings may be accomplished in any desired known manner and/or with locking means of any design, so that the locking is accomplished, e.g., by means of a screw connection, by means of a bayonet closure or by means of catch means.

According to an especially advantageous embodiment of the present invention, it is provided that SC holding clamps and/or catch clamps of the transceiver and/or the coupling in the IP67 protective housing do not engage with the SC insert and/or the SC-RJ insert; the SC holding clamps and/or catch hooks for the SC and/or SC-RJ plug insert are not widened (but are always present on the jack arrangement); and on insertion of an IP20 service plug arrangement, it reliably engages with the SC holding clamps/catch hooks and/or push-pull locking means of the transceiver and/or the coupling.

In this regard the SC plug arrangement/SC insert and the auxiliary frame/zinc die-cast adapter are especially preferably modified in such a way that the SC holding clamps on the IP67 plug side are "irrelevant" and the SC inserts are secured axially somewhat farther to the rear (away from the plug face) in a receptacle geometry, preferably a groove or the like and are secured axially. Therefore, an expensive two-part plug housing with axial displacement of one of the two housing parts and the stops may be omitted.

It is also possible to implement an identical plug housing for all copper and fiber-optic inserts. It is possible for an IP20 service plug to still be reliably engaged even after many years on the IP67 side of a wall feed through or an IP67 device. Furthermore, a standardized, rapid and simple assembly from the beginning is ensured without possibilities for error. This also yields a robust design in which none of the individual parts can break during assembly.

It is also advantageous that throwing a fiber loop of up to 2 mm onto the rear of the screw connection through axial pressure is also prevented. An increase in the joint damping is also avoided, just as the transfer of the displacement force of the sliding sleeve over the fibers can be avoided.

Furthermore, the plugging force and pulling force can be greatly reduced and a high pull-out force can be achieved (rear part not displaceable/assembled from the beginning and fixed stop; Kevlar crimping on the zinc die-cast adapter).

Moreover, a higher static transverse load/transverse bending stress may also be applied to the screw connection, and substantial costs can be saved in investment as well as in cable finishing.

Finally, it is readily possible to transfer this approach to existing IP67 protective housing variants (same insert) and thereby create a modular concept with a wide variety of inserts.

BRIEF DESCRIPTION OF THE DRAWINGS

Other objects and advantages of the invention will become apparent from a study of the following specification, when viewed in the light of the accompanying drawing, in which:

FIG. 4a is perspective view of the optical plug assembly, FIG. 4b is a perspective view of one of the optical plug connectors of the assembly of FIG. 4a, and FIG. 4c is a perspective view of the auxiliary frame of the assembly of FIG. 4a.

DETAILED DESCRIPTION OF THE INVENTION

Figure 2:
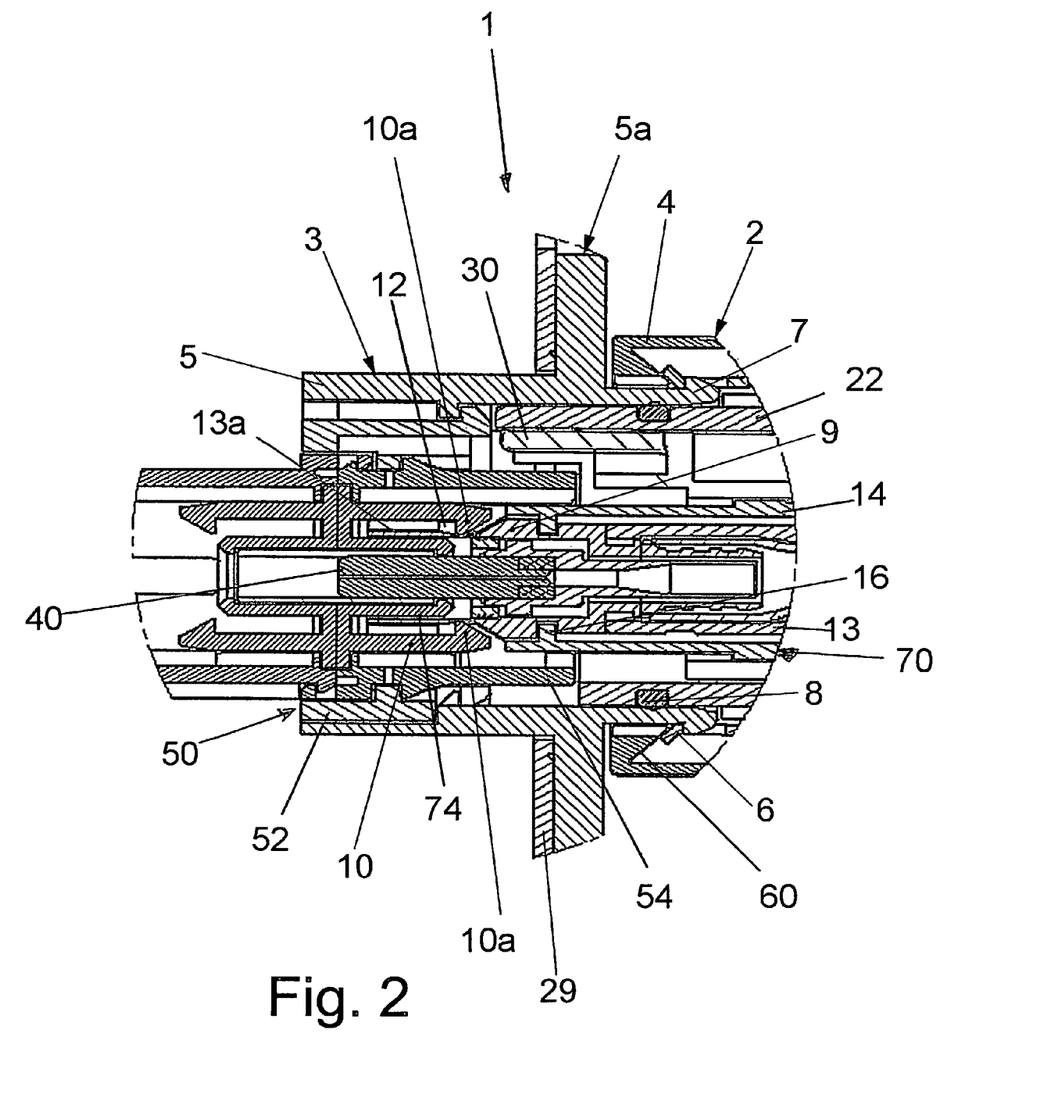
FIG. 2 is a detailed longitudinal sectional view of the assembled optical plug and socket arrangement of the present invention with the socket fastening means in the normal non-deformed unlocked condition.

Referring first more particularly to FIG. 2, the fiber optic connector arrangement 1 of the present invention includes plug and socket connector means 2 and 3 having a pair of telescopically connected outer and inner adapter housings 4 and 5, respectively. Plug mounting means 70 support within the outer adapter housing 4 the plug connector means 9 having a male contact 40. Similarly, socket mounting means 50 support within the inner adapter housing 5 the female connector means 10 having a female contact 74 in engagement with the male contact 40 of the plug connector means 9. The inner adapter housing 5 is mounted in an opening contained in a support wall 29, said inner adapter housing including an integral external flange portion 5a that is fastened to the support wall by screw fastener means or the like (not shown).

According to an important feature of the invention as will be described in greater detail below, the telescopically connected inner and outer adapter housings 4 and 5 are longitudinally displaceable together toward a locked condition in which rigid integral locking projections 60 on the outer adapter housing are snapped into locking engagement with a resilient locking member 6 carried by the inner adapter housing 5. The two adapter housings are designed to protect the plug arrangement 9 and the jack arrangement 10, which are constructed to a lower safety class, such as IP20, relative to the high safety class, IP65 or higher, of the adapter housing. The adapter housings are designed so that they can receive various plug and jack arrangements, including RJ45 and other systems, and for connecting electric conductors as well as various other fiber optic connecting systems, including the RJ45 standard, LC duplex or 2SC at the distance of an SC-RJ connector.

Figure 1A:
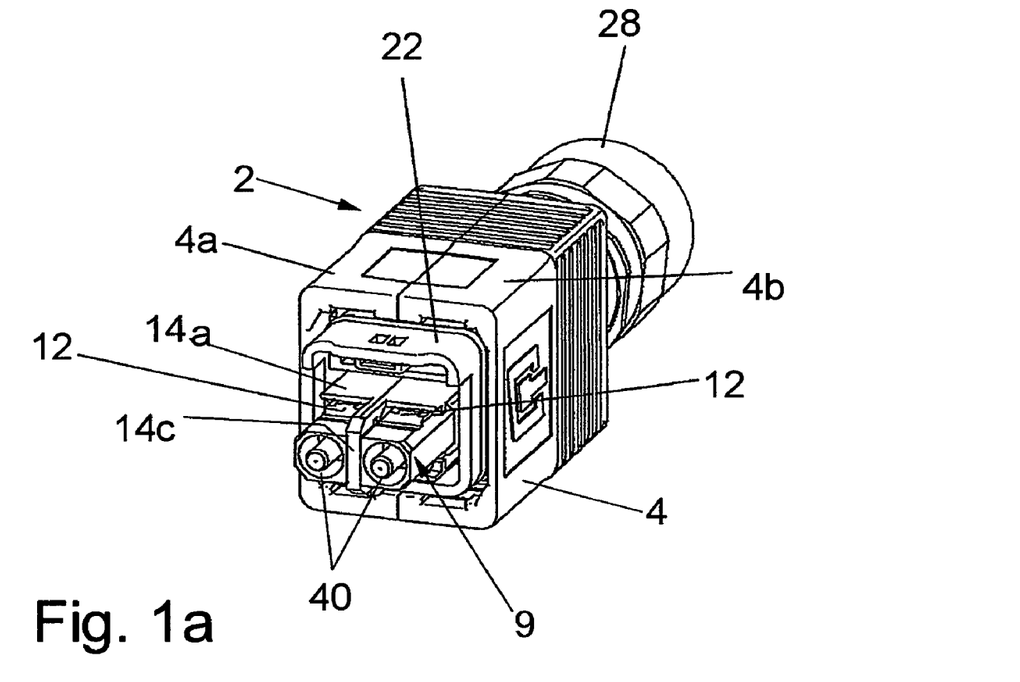
FIGS. 1a and 1b are front perspective views of an optical plug connector arrangement according to the present invention when in the partially assembled and fully assembled conditions, respectively.
Figure 1B:
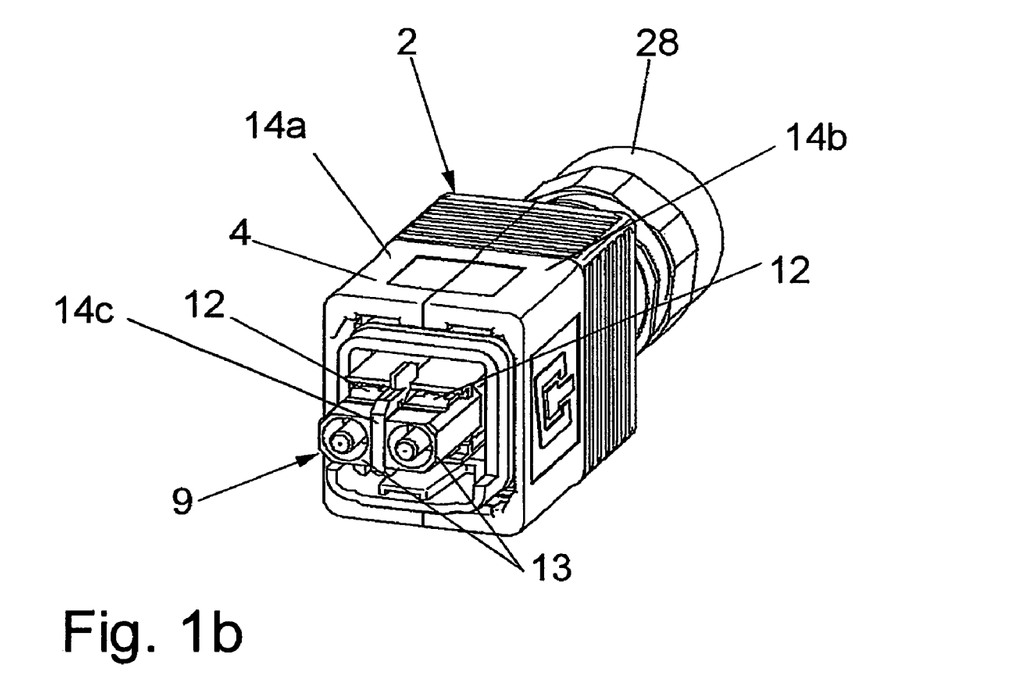
Figure 1C:
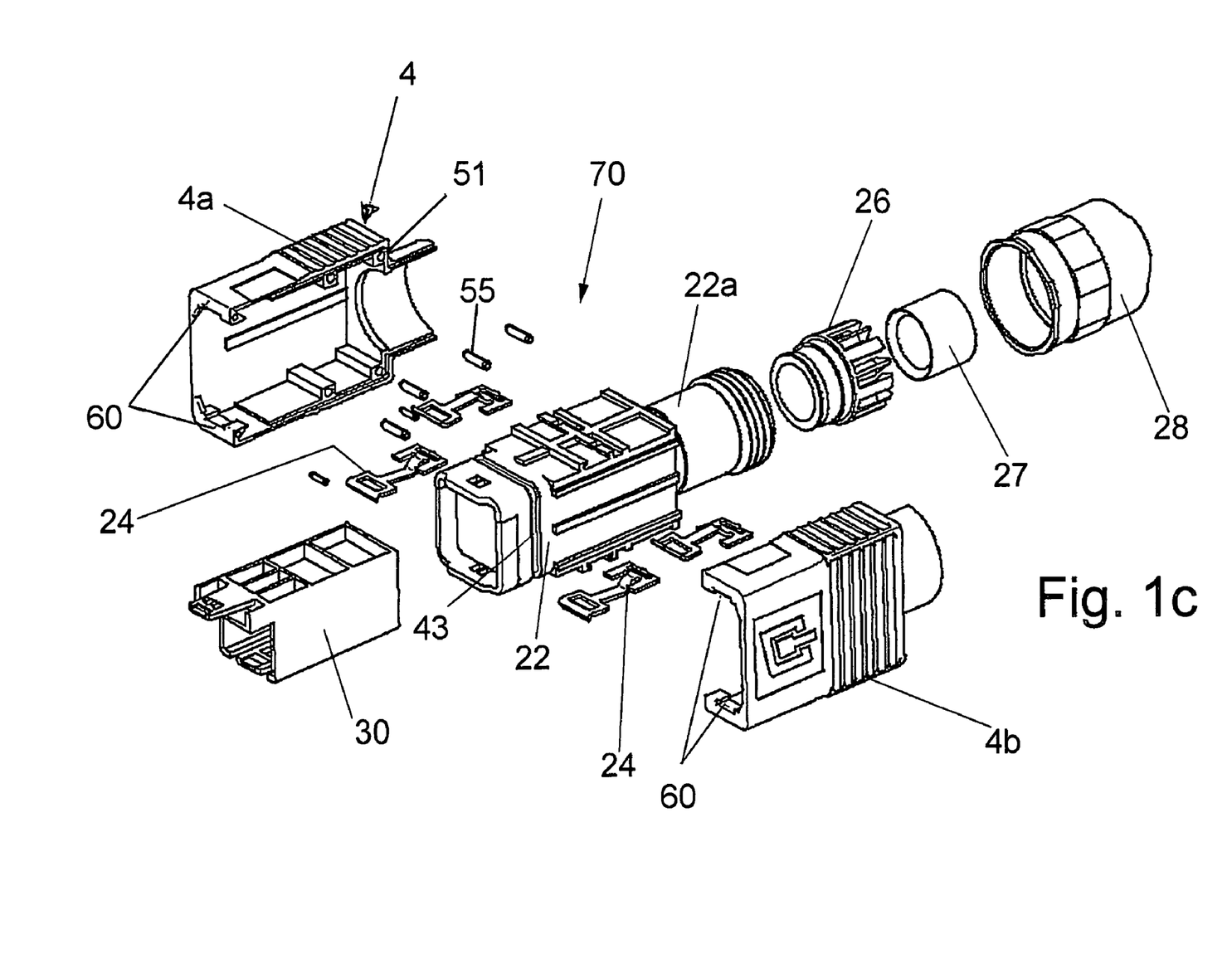
FIG. 1c is an exploded view of the plug connector of FIG. 1b.

Referring now to FIGS. 1a-1c, the outer protective adapter housing 4 is sectional and includes a pair of adjacent longitudinal sections 4a and 4b that are connected by connecting pins 55 (FIG. 1c) that extend into corresponding opposed bores 51 contained in the adjacent surfaces of the sections. The plug mounting means 70 includes a generally rectangular open-ended basic housing section 22 mounted concentrically within the outer adapted housing 4 by catch hooks 24, said basic housing section being provided at one end with an integral externally-threaded cylindrical portion 22a that is adapted for connection with a fiber optic conductor 40 by means of a cylindrical support member 26, a spacer sleeve 27, and an internally threaded locking sleeve 28. A concentric seal element 8 (FIG. 2) is provided in compressed relation between the basic housing section 22 and the inner surface of the inner adapter housing 5.

Figures 4A, 4B:
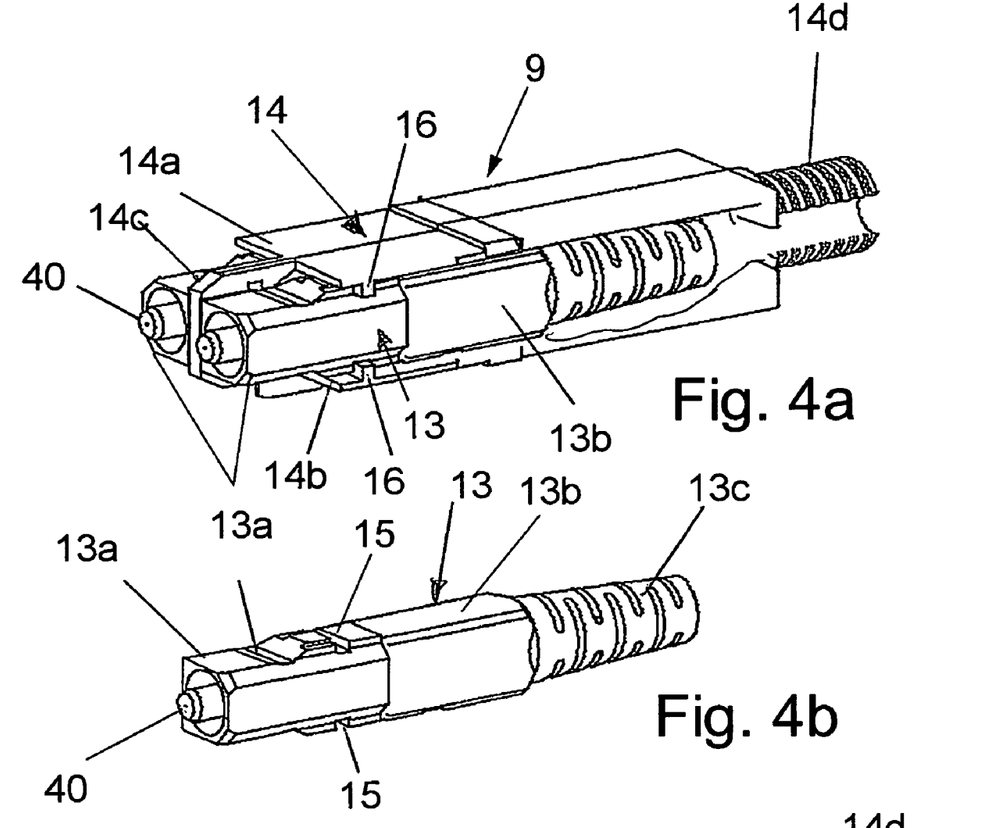
Figure 4C:
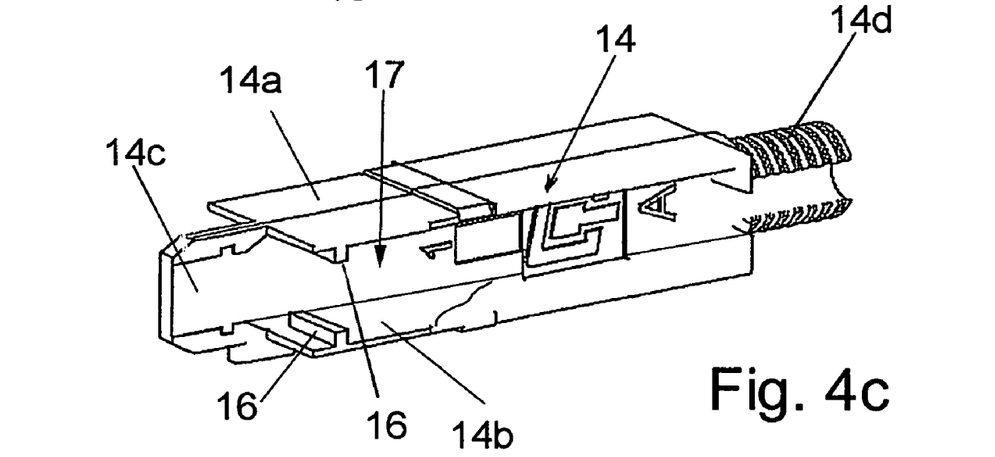

Referring to FIGS. 4a-4c, the plug mounting means 70 further includes a hollow intermediate support frame 30 mounted within the basic housing section 22 for receiving an auxiliary support frame 14 that supports a pair of SC fiber optic cable support sleeves 13 on opposite sides of a vertical longitudinally-extending divider wall portion 14c. Each support sleeve 13 has a reduced first end portion 13a containing an external slotted recess 12, a central body portion 13b, and a flexible tubular second end portion 13c adapted to receive longitudinally a fiber optic conductor having an end portion 40 that projects slightly beyond the free extremity of the sleeve first end portion 13a. The auxiliary frame 14 has horizontal upper and lower support flanges 14a and 14b, and a cylindrical second end portion 14d. Support ribs 16 carried by the adjacent surfaces of the horizontal flange portions of the auxiliary frame 14 extend into corresponding slots 15 provided on the external surfaces of the SC inserts, thereby to prevent relative longitudinal displacement between the components.

Referring again to FIG. 2, the female jack connector means 10 includes a female contact 74 that receives the projecting male end portion 40 of the fiber optic conductor. This female jack connector means 10 is supported within the inner adapter housing 5 by socket mounting means 50 including a main housing 52 that is connected against longitudinal displacement within the inner adapter housing 5, and by an inner mounting member 54. The female jack connector means 10 is formed of resilient metal and is provided with a plurality of circumferentially-arranged longitudinally-extending resilient catch hook portions 10a that extend longitudinally toward the SC insert sleeves 13. In accordance with a characterizing feature of the present invention, each of these catch hook portions 10a extends in a normal unstressed non-deformed condition into a corresponding opposed recess 12 defined in the adjacent end portion 13a of the sleeve member 13. Therefore, there is no physical connection whatsoever between the female jack connector means 10 and the plug connector means 9; the only connection between the connector components is that provided between the projections 60 on the outer adapter housing 4 and the resilient snap locking member 6 carried by the inner adapter housing 5. The clearance between the components is such that there is no deformation of any of the locking hook projections 10a, and consequently there is no loss in the inherent resiliency of these hook portions. Another advantage provided by the connector assembly is that the basic housing section 22 has no components that are relatively displaceable over a period of time.

Figures 3A, 3B:
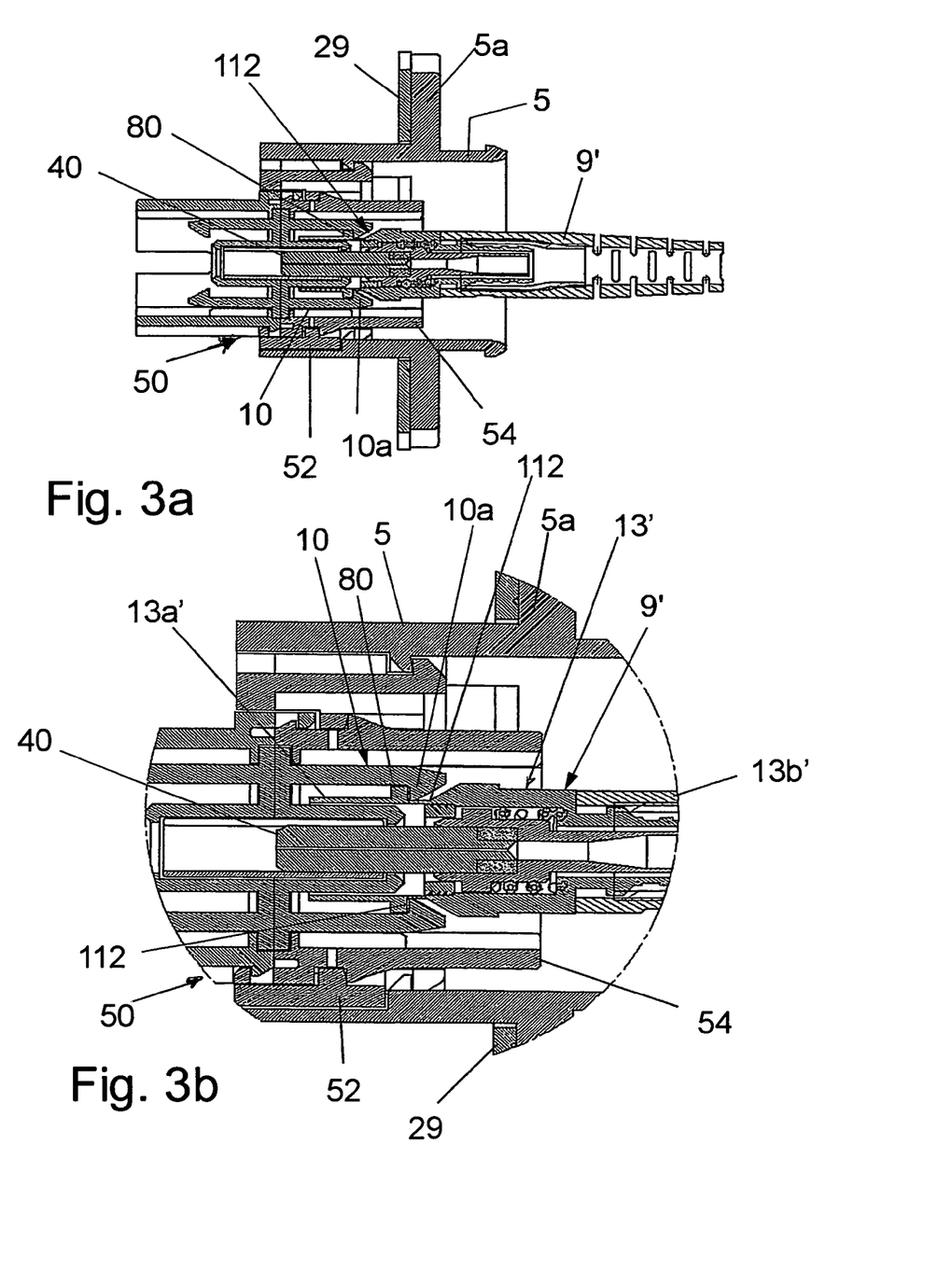
FIGS. 3a and 3b are longitudinal sectional and detailed sectional views, respectively, of the optical socket member when in the deformed locked condition with an optical standard plug connector.

Referring to FIGS. 3a and 3b, it will be seen that when the outer adapter housing is omitted and when a standard SC plug part 9' of the prior art is provided, the customary locking effect is achieved between the deformed resilient locking catch projections 10a and the corresponding locking ribs 80 defined by the catch recesses 112 contained in the end of the plug sleeve 13'.

Figure 5:
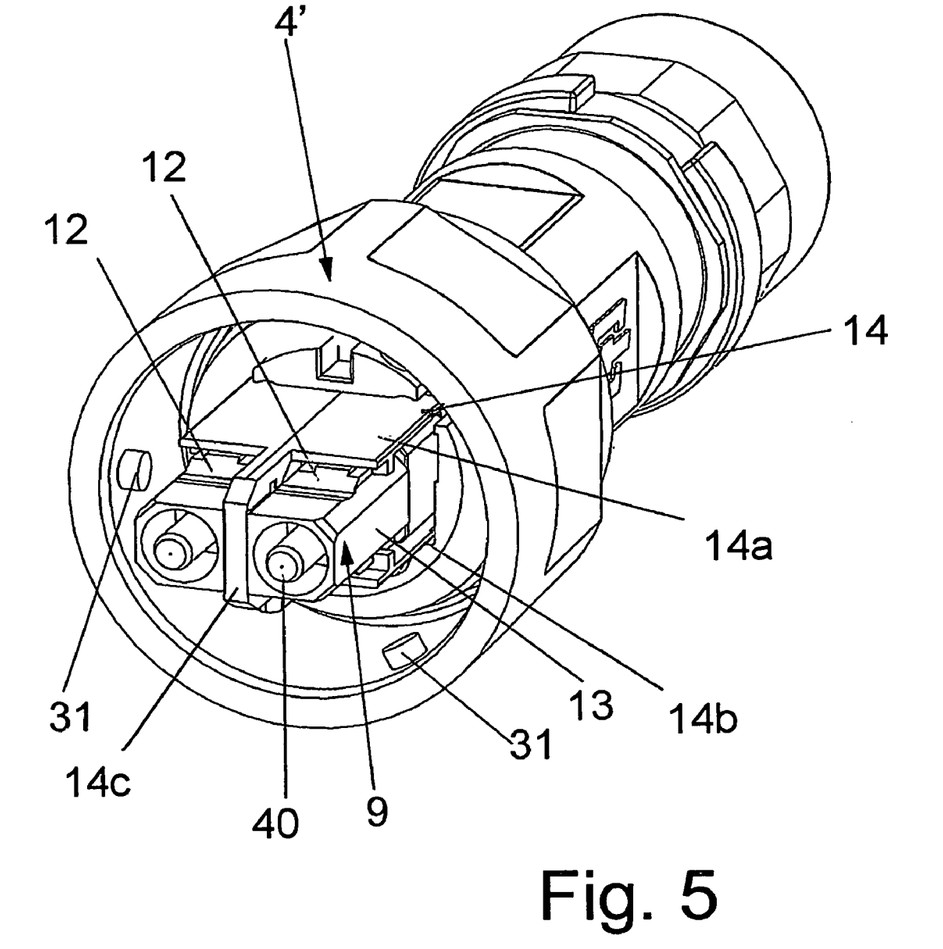
FIG. 5 is a perspective view of a second embodiment of the plug connector means of the present invention.

In the alternate embodiment of the present invention shown in FIG. 5, the locking connection between the inner and outer cylindrical adapter members is achieved by means of a bayonet-type connection including a plurality of integral projections 31 on the inner circumference of the outer adapter housing 4'. These projections cooperate with the bayonet slots (not shown) provided on the inner adapter housing to lock together the inner and outer adapter housings. As before, owing to the provision of the slots 12 in the sleeves 13, there is no deformation and no locking effect between any of the locking projections 10a and the corresponding plug connector means.

While in accordance with the provisions of the Patent Statutes the preferred forms and embodiments of the invention have been illustrated and described, it will be apparent to those skilled in the art that changes may be made without deviating from the invention described above.

What is claimed is:

1. A connector arrangement for connecting together plug and socket connector means (2, 3), comprising:
   (a) a pair of mating adapter housings (3, 4) each containing an open-ended chamber extending longitudinally therethrough;
   (b) plug connector means (9) having at least one male contact (40);
   (c) plug mounting means (70) mounting said plug connector means longitudinally in a first one of said adapter housings;
   (d) socket connector means (10) having at least one female contact (74);
   (e) socket mounting means (50) mounting said socket connector means in a second one of said adapter housings, said adapter housings and said plug and socket mounting means being such that when said adapter housings are arranged in mating end-to-end relation, said male and female contacts are in an operative engaged condition; and (f) locking means for locking together said plug and socket connector means in said engaged condition, said locking means consisting solely of locking members (6, 60; 31) carried by said adapter housings.

2. A connector arrangement as defined in claim 1, wherein said adapted housings comprise telescopically-connected inner (5) and outer (4) adapter housings.

3. A connector arrangement as defined in claim 2, wherein said locking means are operable from an unlocked condition to a locked condition upon longitudinal displacement together of said adapter housings.

4. A connector arrangement as defined in claim 3, wherein said locking members comprise a longitudinally-extending locking hook member (60) integral with one of said adapter housings for engagement with a corresponding locking member (6) carried by the other of said adapter housings, at least one of said locking members being resilient.

5. A connector arrangement as defined in claim 4, wherein said outer adapter housing (4) is sectional and is longitudinally divided to define a pair of longitudinal sections (4a, 4b), and connecting means (50) for connecting together said adapter housing sections.

6. A connector arrangement as defined in claim 3, wherein said locking means include bayonet locking means operable from an unlocked condition to a locked condition by relative longitudinal displacement and twisting of the adapter housings.

7. A connector arrangement as defined in claim 3, wherein said plug mounting means includes:

(1) a hollow open-ended basic housing section (22) arranged concentrically within said outer adapter housing, and (2) an auxiliary frame (14) mounted within said basic housing section, said auxiliary frame including support means for supporting at least one of said plug connector means.

8. A connector arrangement as defined in claim 6, wherein said plug connector means comprises a hollow sleeve insert (13) containing a through passage, and further wherein said male contact comprises a fiber optic conductor (40) having an end portion extending through said sleeve insert passage.

9. A connector arrangement as defined in claim 8, wherein said female socket connector means includes at least one resilient hook fastener means (10a) extending longitudinally toward said male plug connector means, said resilient hook fastener means being resiliently deformable from a normal non-deformed unlocked inoperative condition toward a deformed locked operative condition, said resilient hook fastener means extending, when said plug and socket connector means are in said engaged condition, in said non-deformed unlocked inoperative condition into a corresponding recess (12) contained in said plug connector hollow sleeve insert.

10. A connector arrangement as defined in claim 9, wherein a plurality of said plug connector means are carried by said auxiliary frame.

11. A connector arrangement as defined in claim 10, wherein a plurality of said female socket connector means said socket mounting means supports a plurality of said socket connector means are supported by said socket mounting means in engagement with said plug connector means, respectively.

12. A connector arrangement as defined in claim 11, wherein said inner plug adapter housing (5) comprises an SC-RJ jack arrangement.

13. A connector arrangement as defined in claim 12, wherein said male plug connector means comprises a SC insert.

* * * * *